Patented Aug. 29, 1933

1,924,323

UNITED STATES PATENT OFFICE 1,924,323

PROCESS FOR THE TREATMENT OF RAW MATERIALS CONTAINING SILICIC ACID OR SILICATES AND OXIDES OF HEAVY OR LIGHT METALS

Ernst Justus Kohlmeyer and Xaver Siebers, Berlin-Charlottenburg, Germany

No Drawing. Application December 16, 1930, Serial No. 502,856, and in Germany April 9, 1930

2 Claims. (Cl. 23—142)

The oxides of the light metals and high melting heavy metals (aluminium, beryllium, magnesium, zirconium, chromium, vanadium and the like) are found in nature for the greater part in the form of compounds with silicic acid or with silicic acid as gangue.

The hitherto known processes for the removal of the silicic acid by sintering or melting with additions, by lixiviation or the like did not, however, give the possibility of removing the very important quantities of silicic acid from the said oxide raw materials in sufficient quantity. The production of alumina from silicic acid-rich material is the basis of the following process. The hitherto patented processes for the production of alumina consisted of sintering with soda or alkali in rotary ovens in order to convert the alumina into water-soluble compounds and to separate the associated materials as insoluble products. Since, however, the silicic acid also gives water soluble compounds with alkalies, the raw material must only contain small percentages of silicic acid, so that the sources of supply of the raw materials suitable for use would be very limited. In order to avoid this disadvantage a process was invented according to which the raw material was heated with metal sulphides whose sulphur for example in the case of alumina production was linked to the alumina with the formation of aluminium sulphide in order to take up, in liquid condition, the reduced silicon in the form of alloy. For example, alumina containing silica is heated with iron sulphide and addition of carbon to produce aluminium sulphide and ferro-silicon. Since this reaction can only take place in liquid form it is possible that, on account of an equilibrium arising, the conversion does not proceed to completion and the two elements Fe and Si are present in various forms in different fusion products such as $Al_2O_3$—$Al_2S_3$ melt, iron sulphide melt and finally a metallic melt, so that a separation and treatment of individual phases must be effected by separate processes.

In a similar class lies a process for the production of metals from sulphide ores. This process consists in obtaining metals from heavy metal sulphidic ores, difficultly reduceable oxides being added in order, either to remove the dissociated sulphide sulphur, or in part, in the reduced form, to act as desulphidizing agents for the sulphidic ores and to form an alloy with the heavy metals such, for example as Fe and Si. The object of the present application, namely a complete removal of the silicon from the original oxides is greatly differentiated from this known process, where the silica is reduced and converted into an alloy. This results directly from a manner of operation with this known process which does not provide a wholly homogeneous charge consisting of a single mixture but of a charge of oxide briquettes plus sulphide ores. The difficultly reduceable oxides are first reduced to metals, metalloids or carbides which then act to desulphidize the sulphides dissociated at the high temperature.

Further, there is described later the manner in which the claimed process, by an intimate mixture of silicic acid-containing raw material with the necessary quantity of zinc sulphide, the entire silicon content can be vapourized at low temperatures which can be obtained other than in electric furnaces. In the following the entirely new, hitherto unpublished observations forming the basis of the present process concerning the behaviour of oxide-sulphide mixtures with preponderating alumina and silicic acid on the one hand and aluminium and zinc sulphide on the other hand at various temperatures between 1000 and 1500° C. are recapitulated and an indication of the main characteristics of the process given.

Zinc sulphide commences to vapourize in inert atmospheres at 1100° C. and gives a very high rate of vapourization at about 1450° C. In intimate admixture with carbon the vapourization temperature is reduced by 100 to 150° C. which is attributable to the formation of a more easily vapourizable zinc-carbon-sulphur compound. A corresponding zinc-silicon-sulphur compound is, however, very appreciably more easily vapourizable as shown in that a mixture of zinc blend ZnS with silicon in stoicometric proportions 1:1 commences to vapourize already at about 900° C. and at about 1270° C. attains a very high degree of vapourization. The formation of this particularly easily vapourizable zinc-silicon-sulphur compound forms the basis of the present application. It can be in this case left open as to whether a true Zn-Si-S compound is formed or a mono-molecular mixture of Zn and SiS. The important thing is that it is silicon sub-sulphide SiS which comes in question and not silicon disulphide $SiS_2$. This follows even on the ground that in the vapourization of silicon as $SiS_2$ double the quantity of sulphur is necessary as when the vapourization as SiS is utilized.

By the investigation of the present process it has been found that the above described zinc-carbon-sulphur compound is a very powerful reducing agent for silicic acid. The quartz vessel in which the vaporization of zinc-carbon-sulphur was carried out was strongly corroded. The silicon which was reduced out either takes the place of carbon in the Zn-C-S compound or, as mentioned above, forms when heated Zn+SiS. It must also be expected that when silicic acid, zinc sulphide and carbon are mixed together with one another the reduction of the SiO₂ by Zn-C-S in the nascent state takes place even more energetically as was shown by investigation. This action began at a temperature of about 1000° C. while at 1400° C. conversion at the same time was to the extent of 99%.

It must now be shown as to the behaviour of Al₂O₃ when heated in association with zinc sulphide. Alumina alone is not sulphidized by ZnS in inert atmospheres. It is, however, in admixture with carbon. In the first place similar conditions arise as in the reaction of SiO₂ with zinc sulphide and carbon, i. e. the formation of gaseous Zn-C-S results which then reacts to reduce the alumina. An important point in this is that in contradistinction to the reaction with silicic acid, the reaction with alumina occurs at appreciably higher temperatures of from 1450° C. upwards and further that, in contradistinction to silicon sulphide, aluminium sulphide is not volatile or is only volatile at very high temperatures and then only to a limited extent.

Further investigation has shown that aluminium sulphide Al₂S₃ which does not react with metallic silicon does so with silicic acid and is converted into volatile silicon sulphide.

$$2Al_2S_3 + 3SiO_2 = 2Al_2O_3 + 3SiS_2$$

The essential thing in this reaction is, however, that in part in consequence of the formation of Al₂S₃ only occurring at high temperature, the reaction does not occur until these high temperatures are attained and further at these high temperatures the reaction with Al₂S₃ results in the formation of silicon disulphide SiS₂ and not SiS. This would involve as mentioned in the introduction that for the vapourization in form of SiS₂ double the quantity of zinc-bound sulphur is necessary as would be required in volatilization of SiS. Inversely obviously, with a given quantity of SiS only a half of the molecular equivalent of SiS is vapourized. Of particular importance is the fact that as already stated this latter reaction occurs only at raised temperature. The problem is thus to avoid these high temperatures which are used in electric ovens for carrying out the prior processes and to employ temperatures between 1350° C. and 1400° C. at which with maximum silicon vapourization a maximum vapourization in the form of SiS and not in the form of SiS₂ results.

It has been found that between these temperature limits reaction between ZnS, Al₂O₃ and C proceeds very slowly in the direction of Al₂S₃ formation. Apart from the fact that thereby as mentioned the formation of SiS₂ as a consequence of the possible reaction between Al₂O₃ and SiO₂ is avoided also a fusion of the charge which can only be caused by the lower melting point of Al₂S₃ can be checked.

When there is a detectable iron content apart from the main impurities consisting of silicic acid in the raw material it is to be noted that as a result of the extreme tendency of silica to form vapourous SiS even in the presence of iron, no iron silicon alloy is obtained. Investigation has shown that at the temperature in question of about 1350° C. to 1400° C. no heed need be paid to the formation of iron silicon alloys from silicic acid and any iron oxide which may be present.

From numerous experiments in the present field three results may be given which were obtained under the same conditions. A mixture of kaolin and bauxite containing silicic acid was heated to 1350° C. for thirty minutes with zinc blend and carbon. The following figures show that the proportion of alumina to silicic acid is displaced completely in the direction of alumina.

| Initial material by weight | In residue |
|---|---|
| Al₂O₃:SiO₂ | Al₂O₃:SiO₂ |
| 57.7 :42.3 | 87.2 :12.8 |
| 70 :30 | 98.07 :1.93 |
| 83 :17 | 99.03 :0.97 |

The process is thus to be carried out in the following manner:

The raw material to be freed from silicic acid namely oxides of aluminium, beryllium, magnesium, zirconium, chromium, vanadium and so on are thoroughly mixed in finely divided form with zinc blend and carbon, and in such proportions that for 60 parts of silicic acid in the mixture there are 100 parts of ZnS and about 25 parts of carbon. In this connection it is unimportant whether the mixture so obtained is heated in powder form, briquetted or otherwise pressed or sintered. The heating is effected in such manner that the material is brought as rapidly as possible to the temperature of 1350 to 1400° C. requisite for the rapid volatilization of silicon in the form of SiS. Above all the temperature range of from 900 to 1100° C. must be rapidly traversed in order to avoid premature loss of sulphur as Zn-C-S. If the heating takes place in ovens which do not permit avoidance of contact with combustible gases containing possibly an excess of air, an excess of carbon is employed to ensure a reducing or neutral atmosphere.

In view of the content of elementary zinc silicon, carbon and sulphur the gases liberated from the oven have a high combustibility. They are burnt to produce zinc oxide and silicic acid, from which the former may be removed by lixiviation with acids or alkalies as an electrolyte of considerable parity. According to the temperature at which the burning action is allowed to take place there are obtained as byproducts either an insoluble silicic acid or a colloidal silicic which may be converted into silica gel. The advantages of this process reside in that by a single process a complete breaking down of the initial silicic acid-containing raw material is effected without complex byproducts together with a simultaneous blend oxidation process which must otherwise be undertaken separately in order to obtain zinc.

Thus a zinc mine is in the position if its preparation plan produces in addition to blend, aluminous waste gangue, to prepare therefrom in one operation pure alumina, silicic acid gel and zinc liquor. Also bauxite very rich in silicic acid can be treated from the standpoint of alumina recovery while the zinc sulphide expenditure remains within economic boundaries, particularly as it has been found possible to reduce by flotation the silicic acid content to about 8-12% of SiO₂. In cases where this possibility is present the lowest possible silicic acid content is reached by flotation and the remainder volatilized with the aid of zinc sulphide. Since also blend is for the greater part obtained by flotation, the two substances are available in the finest form and this ensures the best results. It is obvious that any larger grains of zinc blend obtained by wet mechanical treatment must be reduced to the finest divided state.

In order to render the explanation of the preceding method clearer all that has been discussed is exclusively the vapourization of the silicon with the aid of zinc sulphide. It is also possible, however, to bring about the conversion of silicon to SiS with other metal sulphides with the exception of $Al_2S_3$ and for this purpose even FeS may be employed. In contradistinction to the processes hitherto known and described it is necessary to keep the temperatures low about 1350 to 1400° C. in order to avoid as far as possible the formation of $Al_2S_3$ and the vapourization of $SiS_2$.

What we claim is:

1. A process for the treatment of materials containing at least one of the materials silicic acid and silicates; and oxides of metals; comprising rapidly heating the materials in mixture with zinc sulphide and carboniferous substances to a sintering temperature of about 1350°–1450° C., removing the silicic acid as silicon-subsulphide, and recovering the metal-oxides from the residue.

2. A process for the treatment of materials containing silicic acid and aluminum oxide and oxides of other metals, consisting in rapidly heating these materials in mixture with zinc sulphide and carboniferous substances to a sintering temperture of about 1350°–1450° C., removing the silicic acid as silicon-subsulphide, and recovering the aluminum-oxide from the residue in any appropriate manner.

XAVER SIEBERS.
ERNST JUSTUS KOHLMEYER.